Feb. 10, 1959    L. A. OHLINGER ET AL    2,873,238
METHOD OF MAKING JACKETED FISSIONABLE SLUG
Filed July 11, 1946

Witnesses:
Hubert E. Metcalf
Nelson C. Cuddleback

Inventors:
Gale J. Young
Leo A. Ohlinger
By:
Robert A. _____
Attorney:

United States Patent Office 2,873,238
Patented Feb. 10, 1959

2,873,238

METHOD OF MAKING JACKETED FISSIONABLE SLUG

Leo A. Ohlinger, Chicago, Ill., and Gale J. Young, Oak Ridge, Tenn., assignors to the United States of America as represented by the United States Atomic Energy Commission Application July 11, 1946, Serial No. 682,956

3 Claims. (Cl. 204—154.2)

This invention relates to new and useful improvements in metal-jacketed metallic bodies and more particularly to an improved end closure for metallic bodies of a highly reactive nature, such as, uranium, thorium and the like, that are encased within relatively inert or non-corrodible metal jackets and thereby effectively sealed from contact with external reactive gases and liquids.

In various uses of corrodible metal bodies or slugs such as, rods, cylinders or other shapes, it is desirable that the bodies be provided with jackets or coverings of relatively inert or non-corrodible metals such as aluminum over their exposed surfaces to prevent corrosion of the metal bodies upon exposure to gases or liquids. For example, in one such use of bodies of this type, jacketed uranium or other fissionable metal bodies are positioned in a tubular conduit or passage of a neutronic reactor through which a coolant flows as disclosed and claimed in the copending application of Enrico Fermi and Leo Szilard, Serial No. 568,904, filed December 19, 1944, and granted on May 17, 1955, as U. S. Patent No. 2,708,656. In apparatus of this type, the jacketed and sealed metallic bodies are subjected to bombardment by neutrons for the purpose of producing radioactive fission products and transuranic elements. The conduits or passages in which the bodies are positioned generally are only slightly larger in diameter than the bodies; and, in order to maintain the surface temperatures of the bodies within a desired range during neutronic bombardmen thereof, there is passed through the conduit or passage and over the bodies a stream of a suitable coolant fluid such as, for example, air or water. Uranium is highly reactive with oxygen and water, particularly at elevated temperatures; hence it is desirable that a suitable jacket or covering of a relatively inert or non-corrodible metal be provided upon the uranium body and that the closures therefor shall be perfectly sealed to prevent entrance of the coolant.

The provision of protective jackets or coverings upon such corrodible bodies presents certain problems of a substantially more complex and difficult nature than merely the protection of the body from contact with radioactive coolant fluids. Thus, for example, in the typical use herein described, wherein uranium bodies are subjected to neutron bombardment while in a tubular conduit or passage of restricted area, any leakage of the coolant fluid through the jacket or covering into contact with the uranium body will result in oxidation of the uranium, causing expansion and distortion of the jacket or closure thereby increasing the diameter of the jacketed body to such an extent that it may become wedged or jammed within the conduit or passage of the neutronic reactor and cannot be removed therefrom. When a uranium body that is undergoing neutron bombardment within a neutronic reactor of this type becomes wedged or jammed in this manner, an extremely dangerous condition is presented in that the circulation of the coolant through the reactor may be cut off causing undue temperature rises within the reactor.

It is essential, therefore, that the jacket or closure for the uranium body shall be leakproof to prevent water or other coolant fluids from penetrating within the closure to the uranium body or the like causing corrosion thereof. It is therefore obvious that it is necessary to provide canned slugs for a neutronic reactor in which surface defects, pin-holes and the like, are eliminated or reduced to a minimum and the end seals or closures for the slugs are perfectly sealed.

With the foregoing in mind, it is therefore a principal object of this invention to provide a novel method of fabricating a jacketed fissionable body or slug to provide an effective leakproof seal between the jacket for the fissionable slug and the end closure therefor.

These and other objects of this invention and the various features and details of the construction and arrangement thereof are hereinafter set forth and described with reference to the accompanying drawing. In the drawing.

Figure 1:
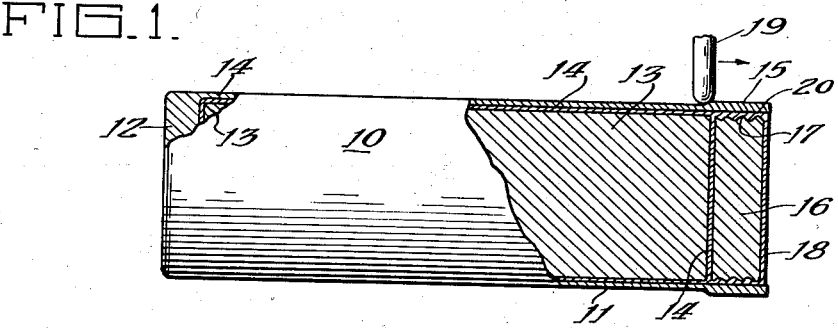
Fig. 1 is a view in elevation of a preferred embodiment of the invention partly in section, illustrating the method of forming a closure for a metal-jacketed uranium slug.

The invention is designed for use in closing the open end of an aluminum or other protective jacket or can for canning uranium slugs. For example, the slugs may be round, having a diameter of from substantially 1 inch to 2 inches and a length from substantially 4 inches to 8 inches.

Referring to the drawings, a finished jacketed body 10 comprises a fissionable metal body 13 provided with a non-fissionable enclosure or jacket 11, preferably constructed of aluminum and having a thick bottom or closed end. Before application of the jacket to the fissionable body the jacket is preferably "tinned" on its inner surface with an aluminum-zinc alloy containing for example, 99 parts by weight zinc and one part by weight aluminum. The uranium slug 13, which is to be canned in this case, is first cleaned by sand blasting and then coated with zinc plus 1 percent by weight aluminum by dipping in a molten metal bath at 460° C. without flux for 1 or 2 minutes forming a bond 14 when inserted in the aluminum can 11 while the metal coatings are in molten state. The assembly is then water-quenched forming a uranium slug thoroughly bonded to the aluminum case by the zinc interlayer. In the preferred embodiment of this invention, the aluminum sheathing 11 has a thickness of substantially 33 to 40 mils, a thickness of substantially 50 mils for the bottom 12, and the zinc-aluminum bonding layer 14 therefor when the slug is assembled is approximately 2 mils.

It is preferred to form the aluminum can 11 with a thickened or upset portion 15 at the end of the can to which the novel closure of this invention is to be applied. The end 15 of the can extends over the end of the zinc coated uranium slug 13 to provide sufficient space for the insertion of a preferred closure member 16. The closure member is a thick aluminum plug 16 preferably formed with serrations, grooves or other projections 17.

In carrying out the preferred method of this invention the serrated aluminum plug 16 is then placed within the can 11 with the can in an upright position and molten zinc-aluminum is then poured in place forming a layer of zinc-aluminum 18 bonding to the zinc-aluminum tinning on the inside of the can 11 and to the zinc-aluminum coating 14 of the uranium slug 13. In order to form a firm bond with the slug, the serrated plug 16 is pressed down firmly on the top of the zinc-aluminum coated slug 13 as the molten zinc-aluminum is being poured. While the can 11 with the aluminum plug 16 is still in its upright position and before the molten zinc-aluminum has had time to thoroughly cool, the thickened or upset end portion 15 of the can is rolled into the serrations 17.

Figure 2:
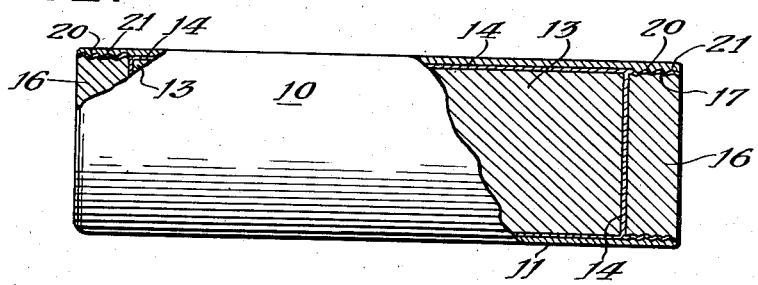
Fig. 2 is a similar view, the closure being shown partially in section, of a completed slug modified from that shown in Fig. 1.

The rolling operation may be performed either by rotating the can 11 against rolls 19 or by rotating the rolls 19 around the can 11, thus forming or rolling the upset portion 15 into the serrations 17 as shown in Figure 2. In performing this rolling operation, the direction would be from the lower end of the upset portion as shown in Figure 1 in an upward direction in the direction of the arrow. By this rolling operation, the can wall will be fitted closely into the serrations 17 in the end closure 16 with a layer of zinc-aluminum 20 between the two.

It is preferred to complete the final finish by machining off the zinc coating 18 of Figure 1, exposing the edge of the zinc bond as illustrated in Figure 2.

The jacketed or canned slug 10, has a long life, even when immersed in water. Tests have indicated that only about 1 millimeter undercutting of the zinc-aluminum per month is had with this type of slug when used in a neutronic reactor of the type set forth above. This long slug life may also be due to the elongated path of the zinc bond 20 formed by serrations 17 of the end plug 16 and the complemental serrations 21 formed in the aluminum jacket 11 by the above described rolling operation.

Figure 3:
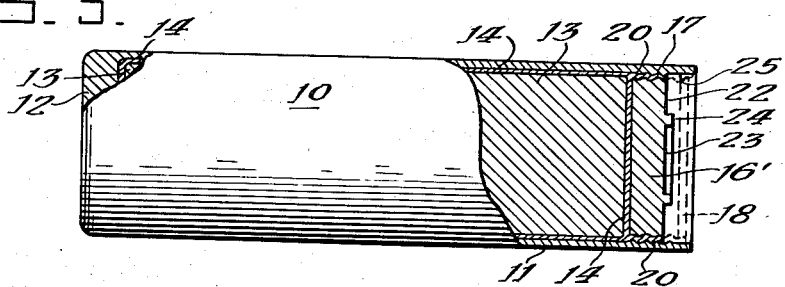
Fig. 3 is a similar view of a modification of the invention, partly in section, illustrating another method of forming a closure for a metal jacketed uranium slug; and, Fig. 4 is a partly sectional view similar to Fig. 3 of a completed slug modified.
Figure 4:
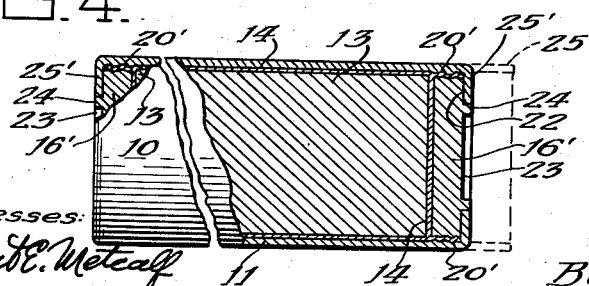

In Figure 3, a modified form of an end plug 16' is illustrated. The end plug 16' may be formed from an end plug 16 like that of Figure 1 when the end plug 16 is assembled with and bonded to its slug 13. In this event, the assembly of slug 13 and end plug 16 are held in a lathe and the plug 16 and the zinc-aluminum layer 20 are cut down so that, as shown in Figure 3, the plug 16 loses part of the coating 18 and becomes the thinner plug 16' having recesses 22 and 23 and an annular rib 24, and the open end of the can 11 projects beyond the plug 16' as indicated at 25. Next, as shown in Figure 4, the end portion 25 of the can 11 is spun over the plug 16' as at 25' so as to abut the annular rib 24 and is welded thereto. It is therefore apparent that there has been formed a type of end closure for a canned or jacketed slug 10 which has the advantages of a simple thick end closure tightly fitting into the can 11 and with its long zinc-aluminum path 20' to protect the slug inside.

Another embodiment of a jacketed slug may be fabricated as further illustrated in Figure 2 from a cylindrical aluminum member opened at both ends and formed with upset portions 15 at each end thereof, tinned with a zinc-aluminum alloy as previously described after which the slug 13 which has been previously zinc-coated is inserted. The end closures 16 are then applied and fabricated as previously described above with reference to the method of formation of the end closures.

Similarly, it is also within the scope of this invention that a canned or jacketed uranium slug 10 may be formed with an end closure at each end thereof, formed in accordance with the method of forming an end closure as described with reference to the modified method of forming end closures, illustrated in Figures 3 and 4.

From the foregoing, it will be evident that a simple and cheaply manufactured form of end closure or jacketed uranium slugs have been provided for closing the open end or ends of the aluminum jackets with which the uranium slugs are encased.

What is claimed is:

1. The method of forming a canned or jacketed fissionable slug which comprises the steps: forming a housing therefor, tinning the interior of the housing, coating the fissionable slug, placing the fissionable slug within the housing, forming end closures for the housing, coating the end closures, and completing the seal by forcing the housing into serrations on the end closures while said tinning is liquid.

2. The method of forming a canned or jacketed uranium slug, which comprises the steps: forming a housing, tinning the interior of said housing, coating a uranium slug, placing the uranium slug within the housing, forming end closures for the open ended housing, serrating the edges of the end closures, coating the end closures, and completing the seal by forcing the ends of the housing into the serrations on the end closures while said tinning is liquid.

3. The method of forming a canned or jacketed uranium slug, which comprises the steps: forming an aluminum housing, tinning the interior of the housing with a zinc-aluminum alloy, coating a uranium slug with a zinc-aluminum alloy, placing the uranium slug within the housing therefor, while said tinning is liquid, leaving a space at each end between the slug and the end of the housing for the closures therefor, forming end closures for the housing with serrations about the periphery thereof, coating and bonding the end closures to the slug and to the housing, and completing the seal at each end of the housing by forcing the ends of the housing into the serrations on the end closures, while said alloy is liquid, whereby an elongated path of alloy is formed between the periphery of the end closures and the complementally formed portion of the housing.

References Cited in the file of this patent

UNITED STATES PATENTS

| | | |
|---|---|---|
| 335,464 | Lorenz | Feb. 2, 1886 |
| 338,849 | Lorenz | Mar. 30, 1886 |
| 1,442,051 | Cummings | Jan. 16, 1923 |
| 1,998,486 | Brown | Apr. 23, 1935 |
| 2,102,885 | Carroll | Dec. 21, 1937 |
| 2,145,168 | Flagg | Jan. 24, 1939 |
| 2,268,244 | Davis | Dec. 30, 1941 |